United States Patent [19]

Murata

[11] Patent Number: 4,642,628

[45] Date of Patent: Feb. 10, 1987

[54] COLOR LIQUID CRYSTAL DISPLAY APPARATUS WITH IMPROVED DISPLAY COLOR MIXING

[75] Inventor: Mitsuhiro Murata, Ianaski, Japan

[73] Assignee: Citizen Watch Co., Ltd., Tokyo, Japan

[21] Appl. No.: 745,774

[22] Filed: Jun. 17, 1985

[30] Foreign Application Priority Data

| | | | |
|---|---|---|---|
| Jun. 22, 1984 | [JP] | Japan | 59-127543 |
| Jun. 22, 1984 | [JP] | Japan | 59-127544 |
| Aug. 28, 1984 | [JP] | Japan | 59-178792 |

[51] Int. Cl.[4] .......... G09U 3/36

[52] U.S. Cl. .......... 340/784; 340/703

[58] Field of Search .......... 340/784, 703, 805, 800, 340/799, 802; 358/17, 88, 3, 152; 350/332

[56] References Cited

U.S. PATENT DOCUMENTS

| | | | |
|---|---|---|---|
| 4,410,887 | 10/1983 | Stolov et al. | 340/784 |
| 4,443,819 | 4/1984 | Funada et al. | 340/784 X |
| 4,578,672 | 3/1986 | Oota et al. | 340/784 X |
| 4,581,608 | 4/1986 | Aftogut et al. | 340/784 X |
| 4,584,572 | 4/1986 | Lambert, III | 340/753 |

FOREIGN PATENT DOCUMENTS

| | | | |
|---|---|---|---|
| 54-104799 | 8/1979 | Japan | 340/703 |
| 54-148496 | 11/1979 | Japan | 340/703 |
| 2130781 | 6/1984 | United Kingdom . | |

*Primary Examiner*—Gerald L. Brigance
*Assistant Examiner*—Vincent P. Kovalick
*Attorney, Agent, or Firm*—Jordan and Hamburg

[57] ABSTRACT

A color liquid crystal display device such as a television receiver employing an array of R, G and B color filters and corresponding liquid crystal display elements, having the color filters arranged in different sequences in mutually adjacent scanning lines, and having a line memory in which display data for the R, G and B display elements of each display line are successively stored and applied to a drive circuit, is provided with color signal processing circuits for controlling R, G and B digital color signals which act to set these color signals into the line memory at the start of each horizontal scanning interval in a correct array sequence for the line of display elements which will be driven during that horizontal scanning interval.

6 Claims, 13 Drawing Figures

COLOR LIQUID CRYSTAL DISPLAY APPARATUS WITH IMPROVED DISPLAY COLOR MIXING

BACKGROUND OF THE INVENTION

Various types of liquid crystal display apparatus such as liquid crystal display television receivers are now being manufactured, which employ a color liquid crystal display unit. Such a display unit generally comprises a matrix array of liquid crystal display elements with correspondingly positioned R (red), G (green) and B (blue) color filters. An array of display color elements is thereby defined, with the intensity of colored light emitted by each element being determined by a drive voltage applied to the corresponding liquid crystal display element. Different types of liquid crystal display device can be employed, i.e. of active matrix type, in which an active control element such as a transistor is provided to control each display element, passive matrix type, in which no individual control elements are employed for the display elements, or an intermediate type of display matrix in which a nonlinear resistance element is provided to control each liquid crystal display element.

In the case of a television display, successive lines of display elements are addressed, (i.e. are selected to be driven by voltages determined in accordance with the R, G and B display data for the various display elements in that line) sequentially, during corresponding horizontal scanning intervals. Each horizontal scanning interval represents the time interval between successive horizontal sync signal pulses. Each display line, i.e. each row of elements, comprises a set of R, G and B color filters arrayed in a fixed sequence, with all of the lines of the display having an identical sequence, e.g. R, G, B, R, G, B, . . . ,R, G, B. However such an arrangement does not provide satisfactory mixing of the primary (red, blue and green) colors, especially when the display has a comparatively low element density. As a result, when the display is viewed from close range, a pattern of vertical stripes will be very apparent. For this reason, it has been proposed to employ an arrangement of color filters in such a display, whereby there will be different sequences of R, G, B color filters in mutually adjacent display lines.

This results in greatly improved mixing of the primary colors, and greatly enhanced viewing characteristics. However if conventional types of color display signal processing circuits are employed to implement such an arrangement, a practical apparatus becomes extremely difficult and complex to produce in practice. For this reason, such an arrangement of color filters in a liquid crystal display apparatus has not been brought to the stage of manufacture up to the present.

SUMMARY OF THE DISCLOSURE

It is an objective of the present invention to overcome the problems which arise in the prior art with respect to practical implementation of a color liquid crystal display apparatus having different array sequences of R, G and B color filters in mutually adjacent display lines for improved mixing of the primary display colors, by providing a simple and practicable signal processing circuit for arranging the color signal data for the respective R, G and B display elements of each display line in a correct array sequence, by the end of each horizontal scanning interval, so that this data can then be stored in a line memory at the end of that horizontal scanning interval to subsequently be applied to drive the display matrix during the succeeding horizontal scanning interval. This signal processing circuit is based upon a parallel/parallel converter circuit having a plurality of sets of three input terminals, each set coupled to receive one bit of each of the R, G and B digital color signals, and corresponding sets of three output terminals. For each bit of these input R, G and B digital color signals, this parallel/parallel converter circuit controls the transfer of the respective color signals to specific ones of the corresponding set of three output terminals in accordance with the current scanning status of the display, i.e. in accordance with a count of the number of display lines which have been scanned up to that point, during the current frame interval. The R, G and B digital color signals which are thereby transferred to the output terminals of the parallel/parallel converter circuit (appearing successively for each set of R, G and B display elements along a display line) are successively arranged by a signal shifting circuit into a fixed array sequence, during each horizontal scanning interval. At the end of the horizontal scanning interval, the R, G and B signal data thus arrayed sequentially are transferred in parallel into a line memory. Output signals from the line memory then drive the display matrix during the succeeding horizontal scanning interval. In this way, control of the array sequence of the color signal data for each display line, i.e. to array that data in the sequence which corresponds to that of the color filters of that display line, is performed entirely by simple switching in a gate circuit within the parallel/parallel converter circuit. The overall circuit configuration can thereby by made very simple, and all data shifting operations are performed at relatively low speed, ensuring high reliability of operation and a low level of power consumption.

DESCRIPTION OF THE PREFERRED EMBODIMENTS

Figure 1:
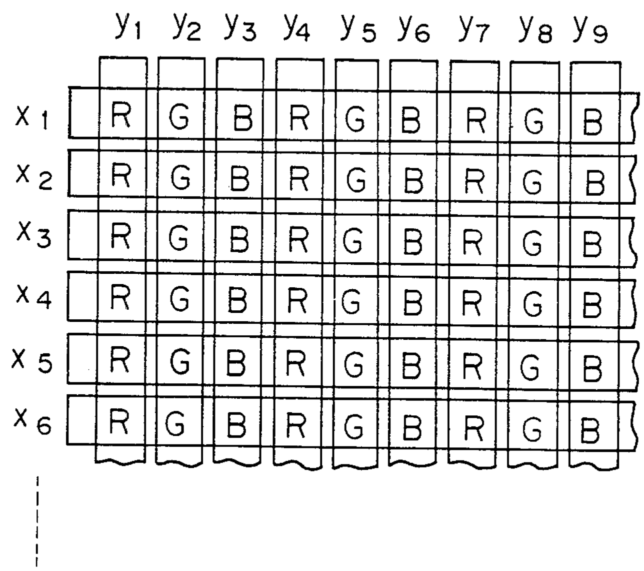
FIG. 1 is a plan view of a matrix array of color filters for a color liquid crystal display apparatus according to the prior art.

Referring first to FIG. 1, a plan view is shown of a prior art arrangement of an array of color filters for a liquid crystal display unit utilized in an apparatus such as a liquid crystal television receiver. $Y_p$, $Y_2$, . . . denote a set of electrodes of the liquid crystal display unit to which signals are applied which vary in accordance with display data, and which will be referred to in the following as data electrodes. $X_1, X_2, \ldots$ denote a set of electrodes which are successively scanned, i.e. each addressed during a specific horizontal scanning interval within each of successive frame intervals, and will be referred to in the following as scanning electrodes. During a horizontal scanning interval in which a scanning electrode is addressed, voltages of magnitude determined by the signals applied to the data electrodes are applied to a row of liquid crystal display elements which are disposed at the intersections between the latter scanning electrode and the data electrodes, whereby the amount of light transmitted through the corresponding R (red), G (green) and B (blue) color filters is determined in accordance with the display data. For simplicity of description, a combination of a liquid crystal display element and the corresponding R, G or B color filter will be referred to in the following as a R, G or B color element. With such a prior art arrangement of the color elements, an identical array sequence (e.g. R, G, B, R, G, B, . . . moving from left to right) is employed in each line of the display. Thus each data electrode line (i.e. each column of display elements) is aligned with a set of color filters of identical color. For example, the first data electrode $y_1$ is aligned with a column of R color filters, the second data electrode $y_2$ is aligned with a column of G color filters, the third data electrode $y_3$ is aligned with a column of B color filters, and so on, i.e. each column has a single color. This is referred to as the color stripe configuration, and has the disadvantage that when the display is viewed from close range, a conspicuous pattern of vertical stripes appears, i.e. insufficient mixing of the R, G and B primary colors is produced.

Figure 2:
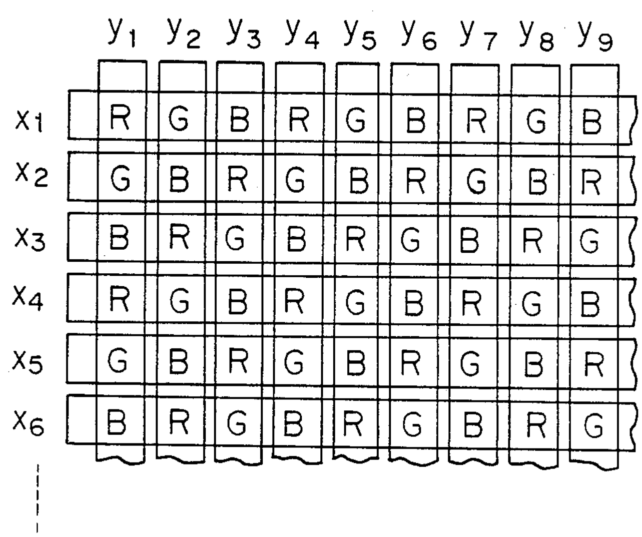
FIG. 2 is a plan view of a matrix array of color filters for a color liquid crystal display apparatus according to the present invention.

FIG. 2 shows an example of a color filter array configuration which has been proposed in order to overcome the problem described above. Here, a first sequence of R, G and B color filters occurs on the scanning lines numbered 3, 6, 9, . . . , (counting from the topmost line of the display) i.e. in general numbered as 3N where N is a positive integer or zero. A second sequence of color filters is implemented on display lines numbered 2, 5, 8, . . . i.e. lines numbered as (3N+2), and a third sequence of color filters occurs on display lines numbered 1, 4, 7, . . . i.e. lines numbered as (3N+1). Such a configuration has been disclosed in Japanese Pat. Nos. 59-46686 and 59-61818.

However due to the difficulty of practical implementation of signal processing circuits to drive a display having a configuration of the form shown in FIG. 2, no color liquid crystal display apparatus incorporating such a color filter arrangement has been disclosed hitherto which employs the generally utilized line-by-line drive method, i.e. in which all of the elements in each row of display elements are driven in common during a corresponding drive interval (horizontal scanning interval) within each frame interval. In Japanese Pat. No. 59-46686 referred to above, it is assumed that point-by-point sequential drive operation is used, and the arrangement disclosed can only be utilized with an "active matrix" configuration of liquid crystal display elements, i.e. a matrix in which each display element is individually controlled by an active element such as a TFT. However, even when a TFT type of active matrix array of liquid crystal display elements is employed, it is in practice not possible to employ the point-sequential method of drive operation is used unless the size of the display is small and the display element density very low. This is due to the fact that the duty ratio for which each display element is driven will be very low, i.e. there will be insufficient time available during the intervals in which the display elements are driven to fully charge the various electrode and display element capacitances, so as to establish the correct levels of drive voltage on each display element. The line-by-line drive method however provides the maximum possible time duration (i.e. one horizontal scanning interval in each frame interval) for driving each liquid crystal display element.

In Japanese Pat. No. 59-61818 referred to above, part of a display signal processing circuit for a line-by-line drive method is described. However in that disclosure the display color signals for all of the elements of a display line are input to a single shift register which performs serial-to-parallel conversion. Such a shift register must be capable of performing high-speed read-out of the color display signals, so that various problems will arise with respect to reliability of shift operation. In addition, a high level of power will be consumed by such a circuit.

Figure 3A:
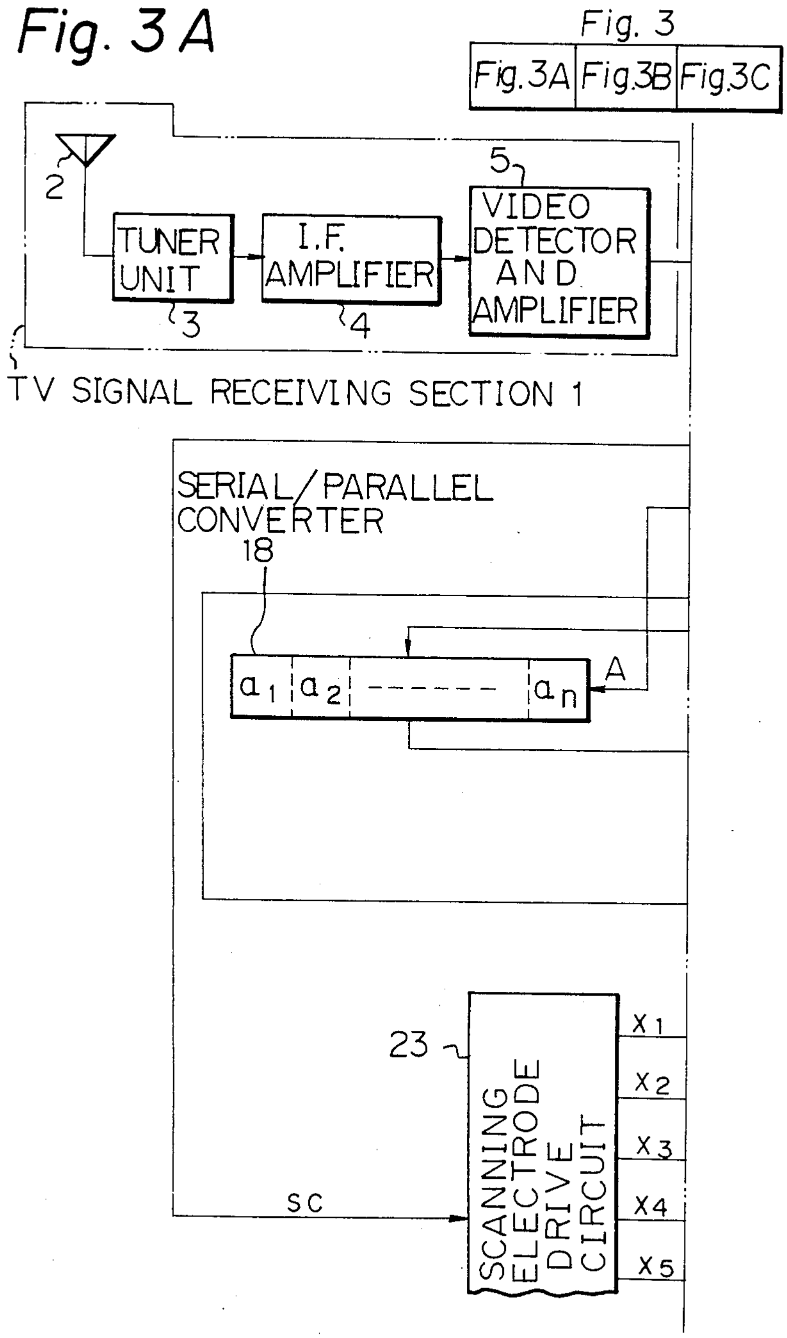
FIGS. 3A, 3B and 3C are a general block circuit diagram of a first embodiment of a color liquid crystal television receiver according to the present invention.
Figure 3B:
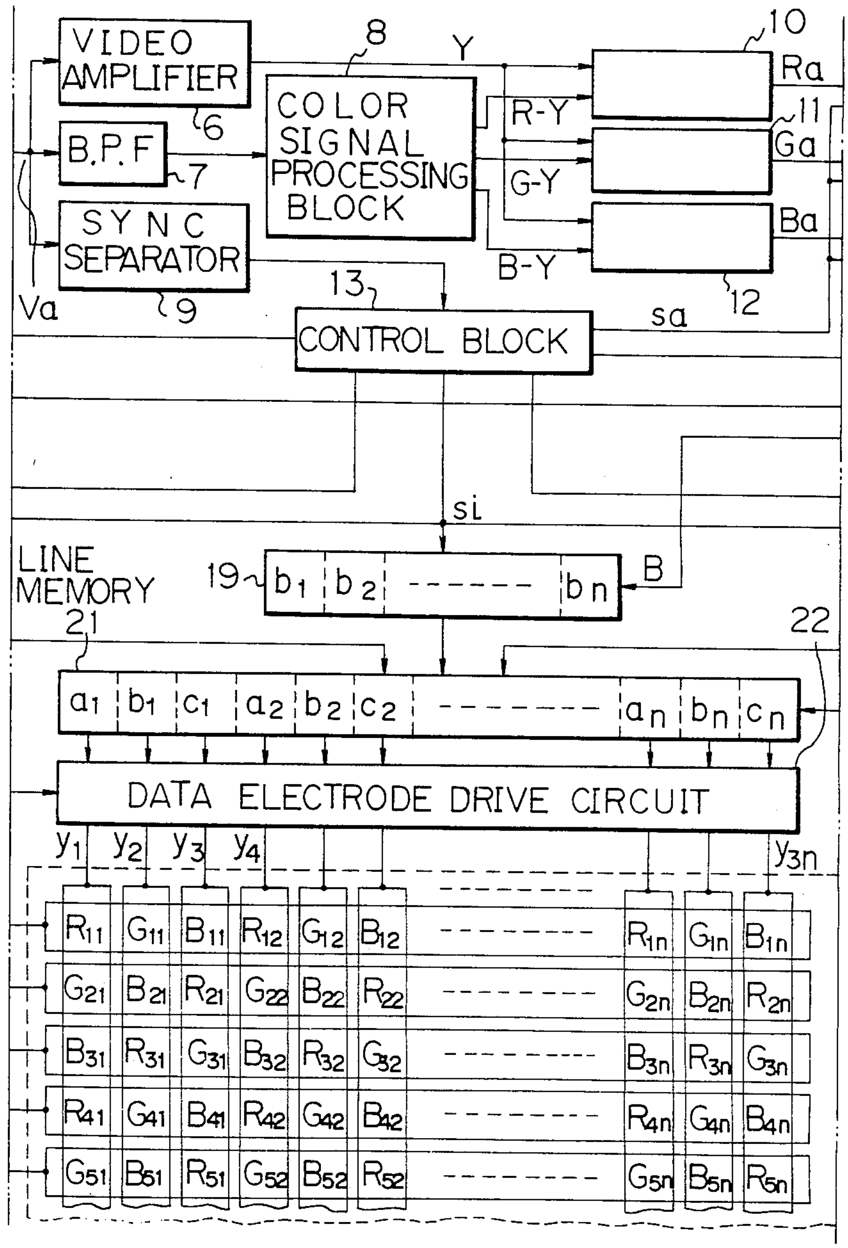
Figure 3C:
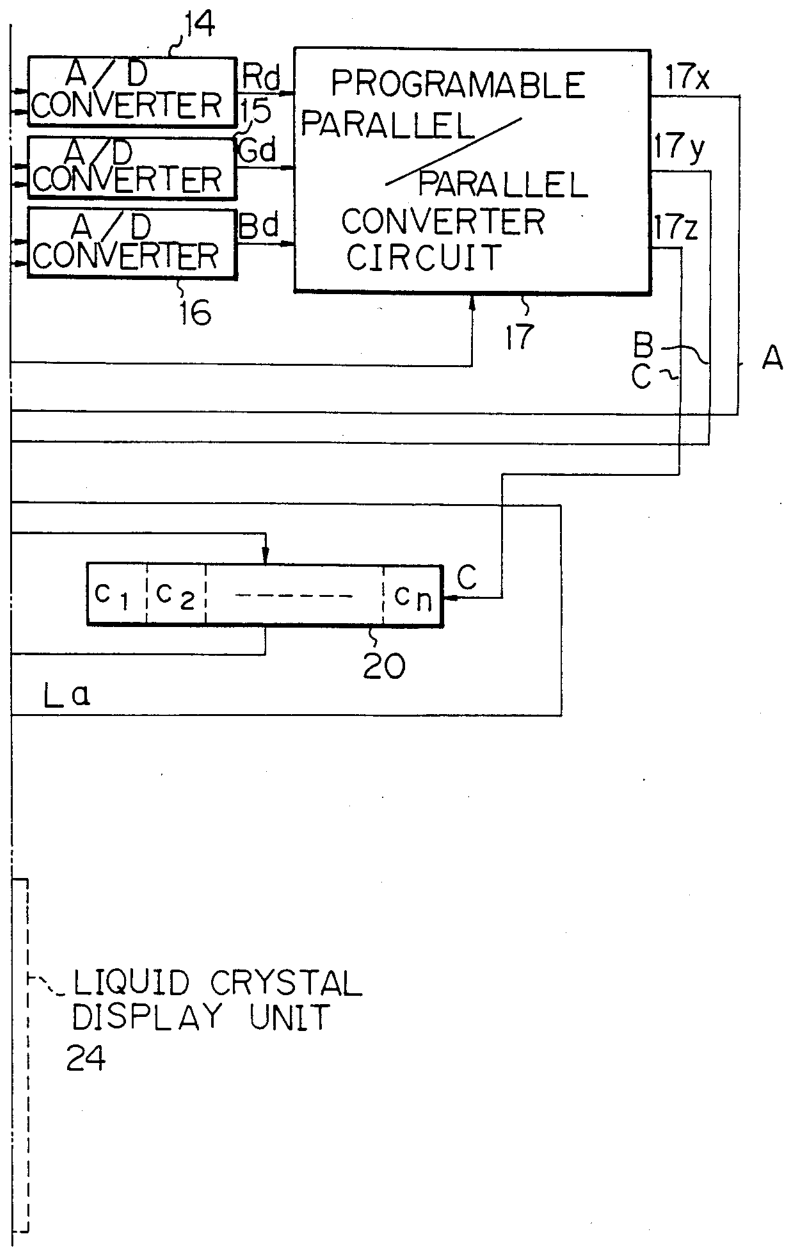
Figure 4:
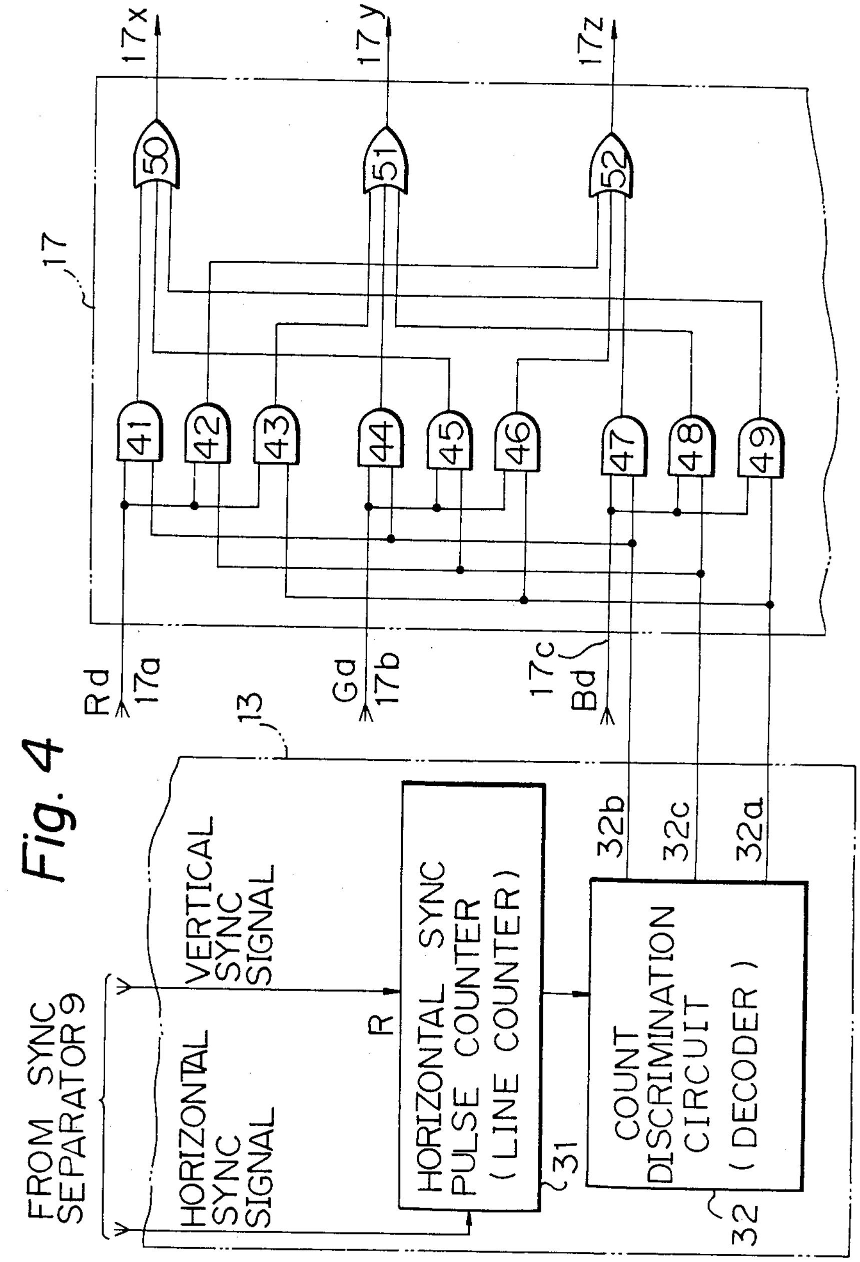
FIG. 4 is a block circuit diagram of parts of a parallel/parallel converter circuit and control block shown in FIG. 3.

Referring now to FIG. 3, an embodiment of the present invention will be described which comprises a liquid crystal display color television receiver. In FIG. 3, numeral 1 denotes a television signal receiving section, in which numeral 2 denotes a television receiving antenna, and numeral 3 denotes a tuner section comprising a high-frequency amplifier circuit, mixer and local oscillator, etc. Numeral 4 denotes an I.F. amplifier circuit, whose output signal is applied to a video detector and amplifier circuit 5.

The color television video signal designated as Va which is produced from television signal receiving section 1 is input to a video amplifier 6 and to a sync separator circuit 9, and is also passed through a band-pass filter (BPF) 7 to derive the color signal components of the video signal. The output signal from BPF 7 is applied to a color signal processing circuit 8, and the (R-Y), (G-Y) and (B-Y) color difference signals produced from this circuit are input to circuits 10, 11 and 12 respectively in which the brightness signal component Y, produced from video amplifier circuit 6, is employed to process the color difference signals, to produce the analog color signals designated as Ra, Ga and Ba. Video amplifier 6, BPF 7, color signal processing circuit 8 and sync separator circuit 9 are well known in the art, so that no detailed description of these will be given in the following. Sync separator circuit 9 performs separation of horizontal and vertical sync signals and produces these as output signals. The color signal processing circuit 8 serves to produce and amplify the R - Y, G - Y and B - Y color difference signals, as is well known in the art.

Control block 13 receives the vertical and horizontal sync signals from sync separator circuit 9, and produces various control signals necessary for display signal processing and also timing control signals which are necessary for display drive purposes.

A set of R, G and B analog/digital converter circuits 14, 15 and 16 respectively serve to convert the analog color signals Ra, Ga and Ba from R output circuit 10, G output circuit 11 and B output circuit 12 respectively, into digital color signals Rd, Gd and Bd respectively, in accordance with a sampling timing control signal Sa from control block 13. These digital color signals are input in parallel to a programmable parallel/parallel converter circuit 17, described in detail hereinafter, to be transferred to output terminals 17x, 17y and 17z thereof. The digital color signals thereby output from terminals 17 of programmable parallel/parallel converter circuit 7, and respectively designated as A, B and C, are input to first, second and third serial/parallel converter circuits 18, 19 and 20 respectively, in accordance with a shift timing control signal $S_i$ from control block 13 (the latter control signal having the same period as sampling timing control signal $S_a$). Programmable parallel/parallel converter circuit 17 serves as control means for performing selective switching control to determine which of the first, second and third serial/parallel converter circuits 18, 19 and 20 is currently connected to receive the digital color signals Rd, Bd and Gd, with this switching being carried out based on control signals which are output from control block 13. The output signals from first, second and third serial/parallel converter circuits 18, 19 and 20 are latched, in parallel form, into line memory 21 at the timing of a latch timing control signal $L_a$ which is output from control block 13 at the start of each horizontal scanning interval.

During each horizontal scanning interval, data electrode drive circuit 22 produces drive signals which are applied to the data electrodes of color liquid crystal display device 24 in accordance with the level of display brightness specified for each of the display elements in the display line which is driven during that horizontal scanning interval, i.e. in accordance with the R, G and B color signal components, as represented by output signals from line memory 21.

Scanning drive circuit 23 receives a scanning timing control signal $S_c$ from control block 13, and supplies scanning signals to successively select each of the rows of display elements, i.e. each of the scanning electrodes of liquid crystal display device 24, during a corresponding horizontal scanning interval within each frame interval.

The liquid crystal display device 24 is an X-Y matrix type, having an array of color filters of the form shown in FIG. 2 and described hereinabove. As shown in FIG. 3, liquid crystal display device 24 is provided with 3n data electrode lines, where n is an integer. First, second and third serial/parallel converter circuits 18, 19 and 20 therefore each comprise an n-stage shift register. $a_1$ to $a_n$, $b_1$ to $b_n$, $c_1$ to $c_n$ respectively denote the contents of stages 1 to n of each of the three serial/parallel converter circuits 18, 19 and 20, i.e. $a_1$, $b_1$ etc each represent one bit. As shown in FIG. 3, line memory 21 is configured such that the contents of the various stages of the first, second and third serial/parallel converter circuits 18, 19 and 20 (i.e. $a_1$ to $a_n$, $b_1$ to $b_n$, $c_1$ to $c_n$ respectively) are latched therein in the fixed array sequence $a_1$, $b_1$, $c_1$, $a_2$, $b_2$, $c_2$, . . . $a_n$, $b_n$, $c_n$.

FIG. 2 is a circuit diagram showing portions of control block 13 and programmable parallel/parallel converter circuit 17. A horizontal sync signal counter 31 serves to count horizontal sync signal pulses output from sync separator circuit 9, and is reset by each vertical sync signal pulse. The current count value in horizontal sync signal counter circuit 31 constitutes data indicating the display line which is currently selected by the scanning electrode drive signals. A count discrimination circuit 32 comprises a decoder to which the count contents of horizontal sync pulse counter 31 are input, and serves to produce a set of control signals on output terminals 32a, 32b, 32c, which vary in accordance with whether the current count contents of horizontal sync signal counter circuit 31 correspond to a display line numbered as 3N, (3N+1) or (3N+2) being currently selected. Depending upon this, a corresponding one of output terminals 32a, 32b or 32c is set to the high logic level. The control signal outputs thus produced from count discrimination circuit 32 control switching operation by parallel/parallel converter circuit 17 to determine which of the digital color signals Rd, Gd and Bd output from analog/digital converter circuits 14, 15 and 16 are respectively transferred to a set of three output terminals 17x, 17y, 17z of parallel/parallel converter circuit 17.

It should be noted that only a part of the digital signals and the circuits which process these signals are shown in the drawings, for simplicity of description. Specifically, during television signal reception, one set of bursts of (analog) R, G and B signal will be output in parallel from circuits 10, 11 and 12 respectively, for each set of R, G and B color element sets on a currently driven display line. During each horizontal scanning interval, a total of n successive A/D conversion operations will be performed by each of analog/digital converter circuit 10 to 12, thereby successively generating parallel sets of Rd, Gd and Bd digital color signals to drive each of the color element sets in a display line (e.g. the set $R_{11}$, $G_{11}$, $B_{11}$). Each of these sets of Rd, Gd and Bd digital color signals comprises a plurality of bits (generally in the range of 2 to 4 bits) which are output in parallel from A/D converters 14, 15 and 16 respectively. Only the circuits (in parallel/parallel converter circuit 17, serial/parallel converter circuit 18 and line memory 19) which process one bit of each of these digital color signals Rd, Gd and Bd, and only one set of three input terminals and one set of three output terminals of parallel/parallel converter circuit 17 are shown, for brevity of description, and it should be understood that additional circuits and input/output terminals sets identical to those shown, will be required for each additional bit constituting the digital color signals.

The output signals from OR gates 50, 51 and 52 of parallel/parallel converter circuit 17 are respectively applied to output terminals 17x, 17y and 17z thereof.

The operation of this embodiment of a color liquid crystal television receiver will now be described. Positive logic will be assumed, with the logic high and low levels being designated simply as H and L levels respectively. If it is assumed that at the start of an horizontal scanning interval, the count value in horizontal sync signal counter circuit 31 coorresponds to a line number (3N+1), indicating that scanning electrode $X_1$ or $X_4$ or $X_7$ . . . will be addressed during the immediately succeeding horizontal scanning interval, then output 32b of the three output terminals of count discrimination circuit 32, will be set to the H level and outputs 32a, 32c to the L level. As a result, AND gates 41, 44 and 47 of AND gates 41 to 49 in programmable parallel/parallel converter circuit 17 will be enabled. Thus, the digital color signal Rd will appear as output (A) from OR gate 50, digital color signal Gd will appear as output (B) from OR gate 51, while signal Bd will appear as output (C) from OR gate 52. Digital color signals Rd, Gd and Bd are thereby input in serial form to the first, second and third serial/parallel converter circuits 18, 19 and 20 respectively, for the duration of that horizontal scanning interval. When the next horizontal sync signal pulse is output from sync separator circuit 9, i.e. by the end of the latter horizontal scanning interval, n sets of each of the digital color signals Rd, Gd and Bd will have been input to the three serial/parallel converter circuits 18, 19 and 20. At this point, in synchronism with the timing of this latest horizontal sync signal pulse, latch timing control signal $L_a$ is output from control block 13. As a result, the output signals from the first, second and third serial/parallel converter circuits 18, 19 and 20 are latched into line memory 21. In this embodiment, as described above, line memory 21 is configured such that the contents $a_1$ to $a_n$, $b_1$ to $b_n$, $c_1$ to $c_n$ of the various stages of serial/parallel converter circuits 18, 19 and 20 are latched therein in the sequence $a_1$, $b_1$, $c_1$, $a_2$, $b_2$, $c_2$, . . . $a_n$, $b_n$, $c_n$.

The digital color signals are thereby stored in line memory 21 in the sequence Rd, Gd, Bd, Rd, Gd, Bd, . . . , as shown in the drawings. In addition, the array sequence of the color filters in any (3N+1) numbered scanning line of liquid crystal display device 24 (e.g. lines $x_1$ or $x_4$) is also R, G, B, R, G, B, . . . , moving from left to right. Thus, the array sequence of the digital color signals stored in line memory 21 is matched to the array sequence of the color filters of the (3N+1) numbered scanning lines.

Data electrode drive circuit 22 thereupon supplies brightness drive signals to the data electrode lines in accordance with output signals produced from line memory 21.

The last-mentioned horizontal sync signal pulse will now have advanced the contents of horizontal sync signal counter circuit 31 by one, to become (3N+2). Thus, only output terminal 32*c* of the three outputs from count discrimination circuit 32 will now be at the H level. As a result, only AND gates 42, 45 and 48 in programmable parallel/parallel converter circuit 17, gates 42, 45 and 48 will be enabled. Thus, the digital color signal Gd will appear on output terminal 17*x* from OR gate 50, digital color signal B*d* will appear on output terminal 17*y* from OR gate 51, while signal Rd will appear on output terminal 17*z* from OR gate 52, with the output signals from these terminals being indicated as A, B and C respectively in FIG. 3.

Thus, n sets of digital color signals Gd, Bd and Rd, corresponding to n sets of color element sets on a (3N+2) numbered display line, are respectively input in serial form to the first, second and third serial/parallel converter circuits 18, 19 and 20 during this horizontal scanning interval. When the next horizontal sync signal pulse is output from sync separator circuit 9, then in synchronism with the timing of this latest horizontal sync signal pulse, latch timing control signal $L_a$ is output from control block 13. As a result, the output signals from the first, second and third serial/parallel converter circuits 18, 19 and 20 are latched into line memory 21. The digital color signals are thereby stored in line memory 21 in the sequence Gd, Bd, Rd, Gd, Bd, Rd, . . . , as shown in the drawings. In addition, the array sequence of the color filters in any (3N+2) numbered scanning line of liquid crystal display device 24 (e.g. lines $x_1$ or $x_4$) is also G, B, R, G, B, R . . . , moving from left to right. Thus, the array sequence of the digital color signals stored in line memory 21 is matched to the array sequence of the color filters of the (3N+2) numbered scanning lines.

In this case too, as described above, the brightness drive signals from data electrode drive circuit 22 are applied to the data electrode lines in accordance with output signals from line memory 21.

When the next horizontal sync signal pulse is output from sync separator circuit 9, the contents of horizontal sync signal counter circuit 31 are again advanced by one, to become (3N+3), i.e. to become 3N. Thus, only output terminal 32*a* of the three outputs from count discrimination circuit 32 will now be at the H level.

As a result, only AND gates 43, 46 and 49 in programmable parallel/parallel converter circuit 17, will be enabled. Thus, the digital color signal Bd will appear on output terminal 17*x* from OR gate 50, digital color signal Rd will appear on output terminal 17*y* from OR gate 51, while signal Gd will appear on output terminal 17*z* from OR gate 52. Thus, digital color signals Bd, Rd and Gd are respectively input in serial form to the first, second and third serial/parallel converter circuits 18, 19 and 20. When the next horizontal sync signal pulse is output from sync separator circuit 9, then n of each of the digital color signal Bd, Rd and Gd will have been input to the three serial/parallel converter circuits 18, 19 and 20, and in synchronism with the timing of this latest horizontal sync signal pulse, latch timing control signal $L_a$ is output from control block 13. As a result, the output signals from the first, second and third serial/parallel converter circuits 18, 19 and 20 are latched into line memory 21. The digital color signals are thereby stored in line memory 21 in the sequence Bd, Rd, Gd, Bd, Rd, Gd, . . . , as shown in the drawings. The array sequence of the color filters in any 3N numbered scanning line of liquid crystal display unit 24 (e.g. line $X_3$) is also B, R, G, B, R, G, . . . , moving from left to right. Thus, the array sequence of the digital color signals stored in line memory 21 is matched to that of the color filters of the 3N numbered scanning lines.

When the next horizontal sync signal is output from sync separator circuit 9, the count contents of horizontal sync signal counter circuit 31 will be advanced by one, to become (3N+1) once more, and the process described above will be cyclically repeated.

The embodiment of a liquid crystal television receiver according to the present invention described hereinabove enables a display signal processing circuit to be implemented which has a simple and easily manufactured configuration, high reliability of operation and low power consumption, while utilizing a display color filter array arrangement which provides greatly improved mixing of the primary colors. Part of the advantages of this embodiment reside in the fact that the R, G and B analog color signals are independently converted into digital color signals by R, G and B analog/digital converter circuits. Thus these analog/digital converter circuits can each operate from a clock signal of comparatively low frequency, enabling these circuits to operate with a low level of power consumption. Furthermore, the timing interval which is available for completion of each A/D conversion operation is relatively long, so that a correspondingly increased reliability of conversion is achieved.

Furthermore, serial/parallel conversion of the R, G and B digital color signals which are output from the analog/digital converter circuits is performed for each scanning line as a unit, by first, second and third serial/parallel converter circuits which operate in a mutually independent manner. Operation of these circuits is based upon the parallel/parallel converter circuit, which constitutes control means are provided for controlling switching of the R, G and B digital color signals from the R, G and B analog/digital converter circuits such as to determine, during each horizontal scanning interval, which of the first, second and third serial/parallel converter circuits respectively will be supplied with respective ones of the digital color signals. Furthermore, due to the fact that these three serial/parallel converter circuits 18, 19 and 20 operate at a relatively low clock frequency, power consumption of these circuits is low.

The operation of parallel/parallel converter circuit 17 ensures that, at the end of each horizontal scanning interval, the output signals from the first, second and third serial/parallel converter circuits when latched into the line memory will be ordered in an array sequence which matches that of the color filters of the display line which is addressed during the immediately succeeding horizontal scanning interval. It should be noted that if, for example, programmable parallel/parallel converter circuit 17 were not provided between the R, G and B analog/digital converter circuits 14, 15 and 16 and the first, second and third serial/parallel converter circuits 18, 19 and 20, and it were arranged that the digital color signals Rd, Gd and Bd are fixedly input to the first, second and third serial/parallel converter circuits 18, 19 and 20 respectively, then when a total of 3n output signals from the first, second and third serial/parallel converter circuits 18, 19 and 20 have been input to line memory 21, it will be necessary to implement switching control of the 3n output signals from the line memory such as to obtain the appropriate array sequence for the digital color signals to correspond with the scanning lines of the display. Thus, the display signal circuit configuration would become extremely complex.

Figure 5A:
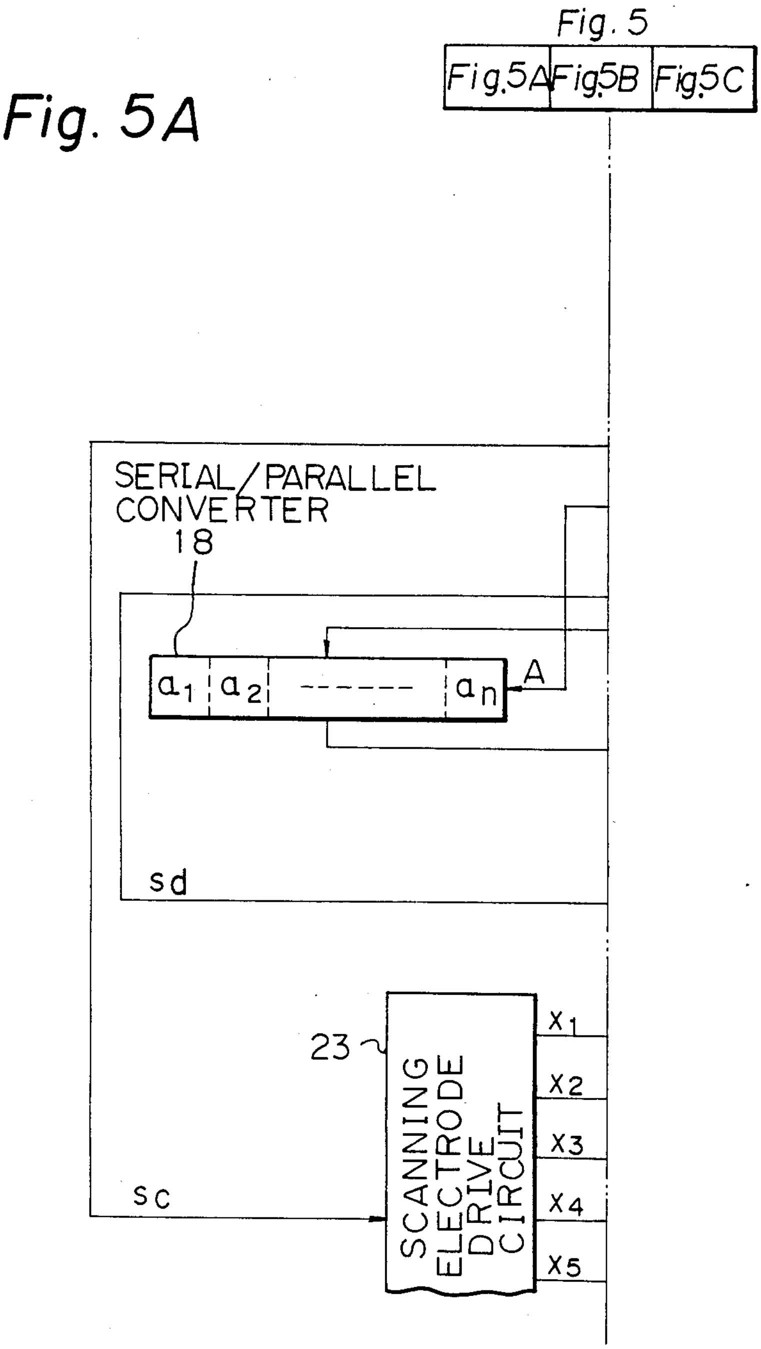
FIGS. 5A, 5B and 5C are a general block circuit diagram of an embodiment of a color liquid crystal display apparatus according to the present invention.
Figure 5B:
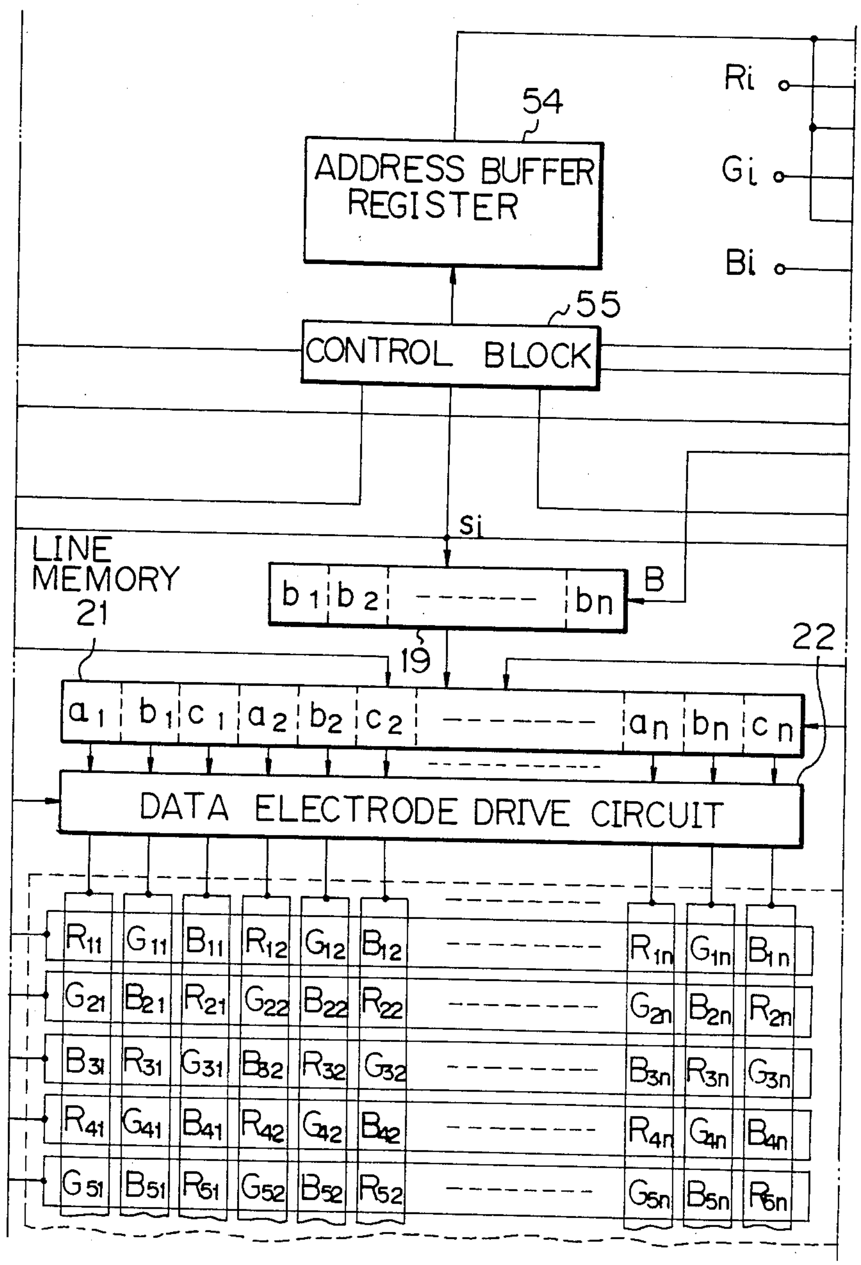
Figure 5C:
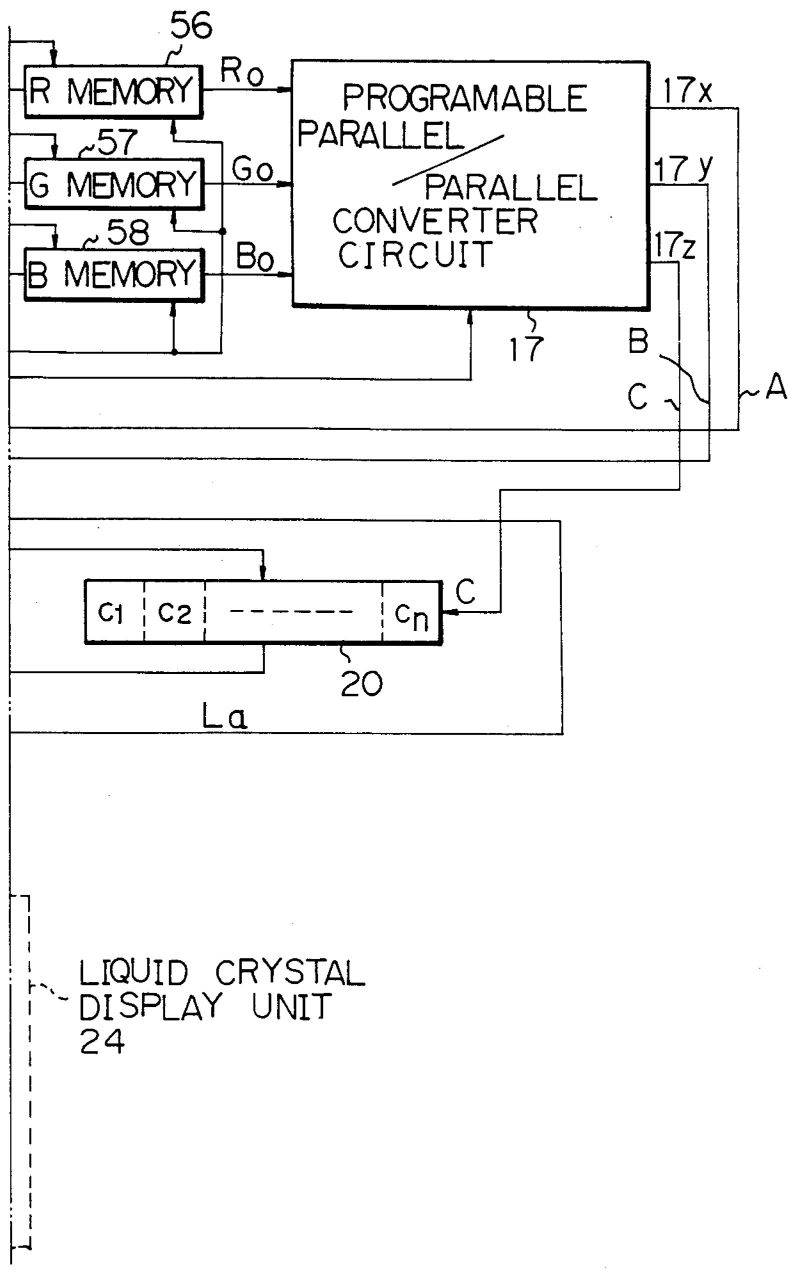

Referring now to FIG. 5, another embodiment of the present invention is shown in general block circuit diagram form. This is a liquid crystal color display apparatus, for displaying data which is directly available as digital color signals, for example from a computer installation. In FIG. 5, the parallel/parallel converter circuit 17, serial/parallel converter circuits 18, 19 and 20, line memory 21, data electrode drive circuit 22 and liquid crystal display unit 24 and the interconnections thereof are basically identical to those of the television receiver embodiment described hereinabove, and so further description will be omitted. Numerals 56, 57 and 58 denote memory circuits for respectively storing R, G and B digital color signal data respectively, in successive address locations. An address buffer register 54 produces signals to control write-in and read-out of data to and from R, G and B memories 56 to 58 and to select the addresses in these memories at which such read/write operations are performed. During each horizontal scanning interval, read/write operations are performed in a consecutive manner, i.e. the write and read control signals can be pulse trains of identical frequency but differing in phase. Since there are n sets of color element sets in each display line as described hereinabove for the first embodiment, n successive data write-in operations are performed in each horizontal scanning interval to store R, G and B color signal data (i.e. input color signals Ri, Gi and Bi) in successive address locations of memories 56, 57 and 58 respectively, while n successive data read-out operations are performed to read out stored data from these successive addresses, i.e. to read out n sets of digital color signals (indicated as Ro, Go and Bo) in parallel, to be input to parallel/parallel converter circuit 17 as in the case of digital color signals Rd, Gd and Bd in the previous embodiment. As in the previous embodiment, only one bit of each of the R, G and B digital color signals, and the circuit portions which process these, are shown.

Figure 6:
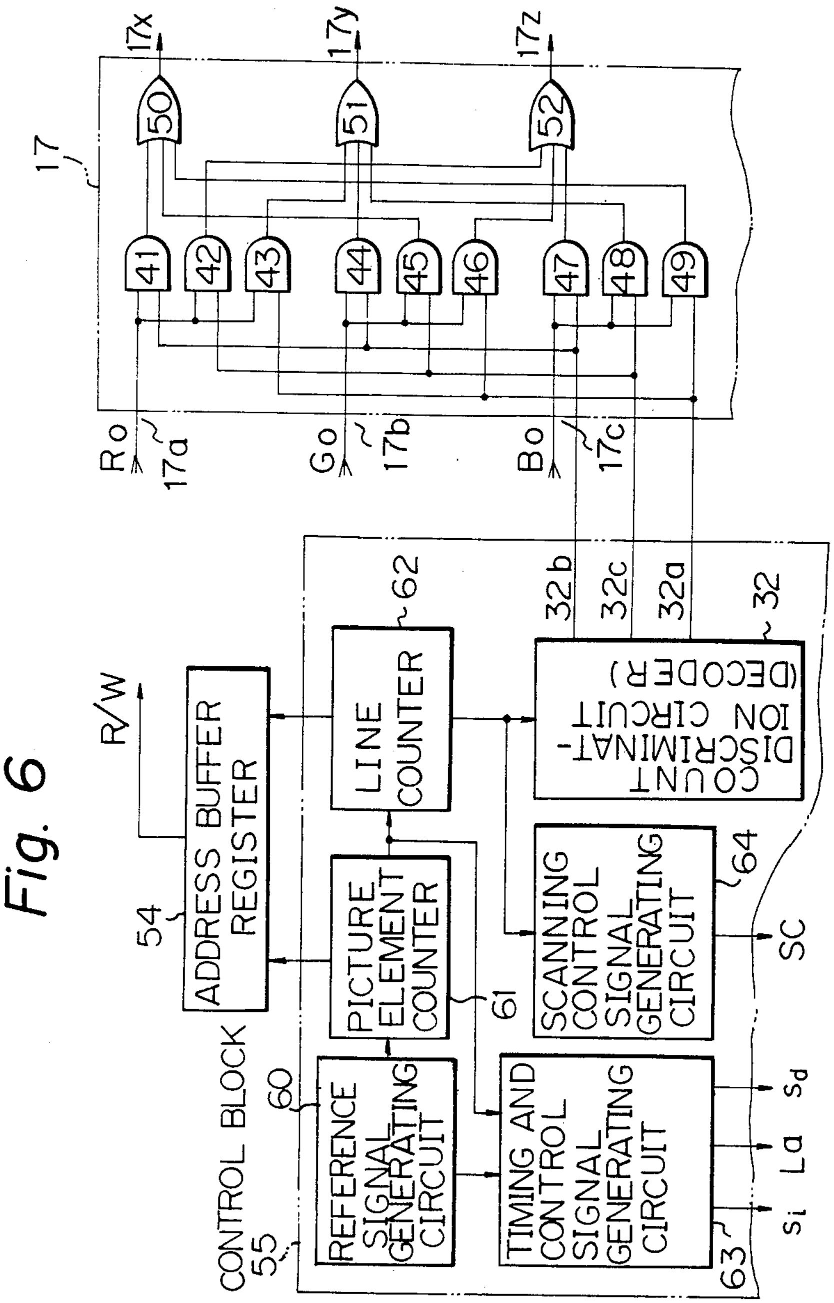
FIG. 6 is a block circuit diagram of a parallel/parallel converter circuit and control block shown in FIG. 5.

FIG. 6 is a block diagram showing portions of control block 55 and parallel/parallel converter circuit 17 of this embodiment, showing the differences between control block 55 and control block 13 of the previous embodiment. A reference signal generating circuit 60 produces reference frequency signals, one of which is input to a picture element counter circuit 61, and consists of a pulse train at frequency such that n pulses occur during each horizontal scanning interval, i.e. one pulse for each of the n color element sets in a display line as described hereinabove. The picture element counter circuit 61 counts by a factor of n, i.e. outputs one pulse in each horizontal scanning interval, and these output pulses correspond to the horizontal sync pulses in the previous embodiment. The output pulses from picture element counter circuit 61 are input to a line counter 62 and also to a timing and control signal generating circuit 63. Line counter 62 counts by a factor which is equal to the number of display lines in liquid crystal display unit 64, and so produces one pulse in each frame interval, i.e. output pulses which are utilized in the same way as the vertical sync pulses in the previous embodiment. The timing and control signal generating circuit 63 produces timing signals $S_i$, $S_d$, $L_a$, etc, having functions as described for the previous embodiment. The output pulses from line counter 62 are input to a scanning control signal generating circuit 64, which produces scanning control signal $S_c$, to be input to scanning electrode drive circuit 23 to synchronize the drive operations thereof with count discrimination circuit 32, which also counts the output pulses produced by line counter 62.

Output signals from line counter 62 and picture element counter circuit 61 are also input to address buffer register 54, to control the timing of read and write control signals applied therefrom to R, G and B memories 56, 57 and 58.

It can thus be understood that the essential features of novelty of this apparatus are similar to those of the first embodiment, with the differences between this embodiment and the previous one being that the R, G and B digital color signals are available directly from an outside source, with no necessity for A/D conversion to be performed, and also that horizontal and vertical sync signals are derived from a reference frequency source rather than from a television signal.

Figure 7A:
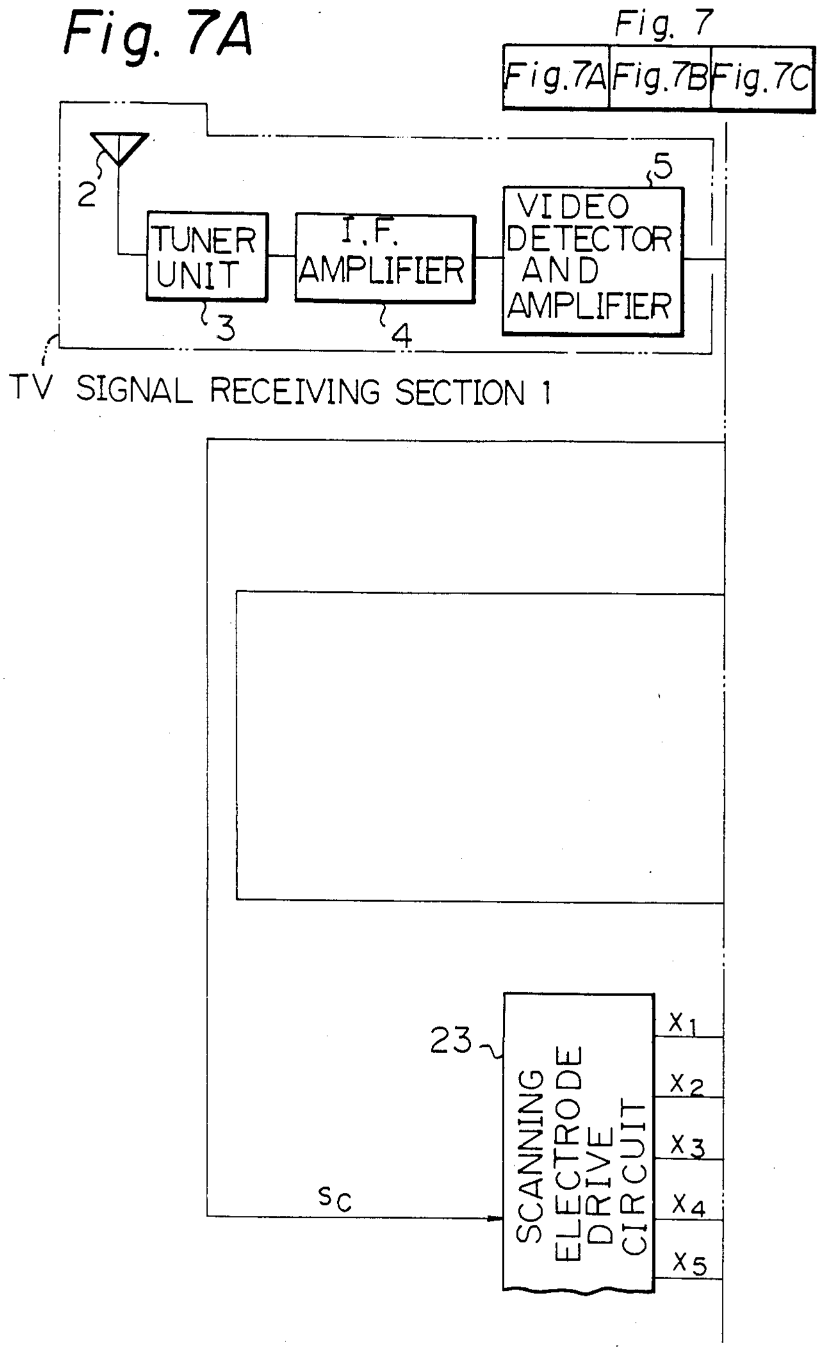
FIGS. 7A, 7B and 7C are a general block circuit diagram of another embodiment of a color liquid crystal television receiver according to the present invention.
Figure 7B:
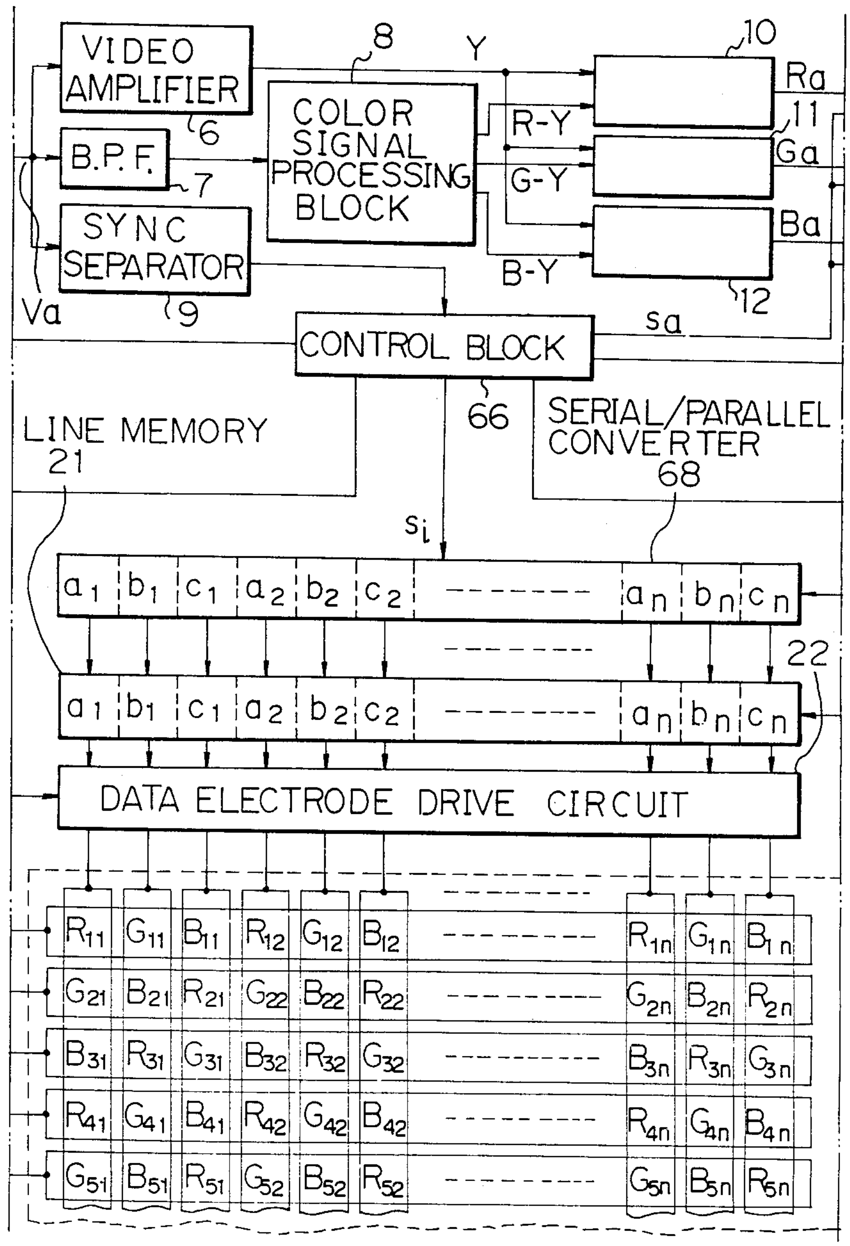
Figure 7C:
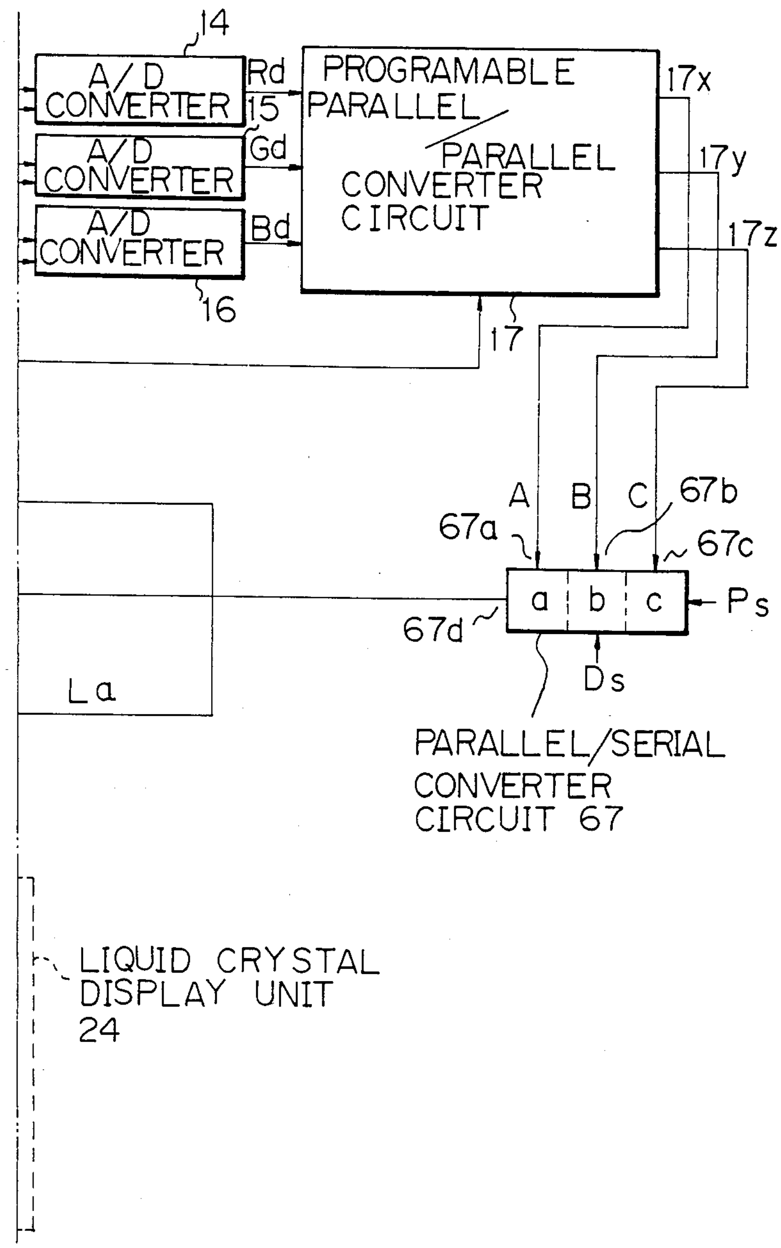

Referring now to FIG. 7, another embodiment of the present invention is shown in general block circuit diagram form. This embodiment is a color liquid crystal display television receiver, as in the case of the first embodiment. Circuit blocks having identical functions to those of the first embodiment are indicated by corresponding reference numerals, and no further description of these will be given. The essential differences between this embodiment and the first embodiment line in the manner in which the R, G and B digital color signals appearing on output terminals 17$x$, 17$y$ and 17$z$ of parallel/parallel converter circuit 17 are transferred to line memory 21, i.e. in the shift circuits which assemble the R, G and B signal data from parallel/parallel oonverter circuit 17 in a fixed array sequence, to be stored in line memory 21 at the end of each horizontal scanning interval. These shift circuits comprise a parallel/serial converter circuit 67, having parallel input terminals 67$a$, 67$b$ and 67$c$ coupled respectively to output terminals 17$x$, 17$y$ and 17$z$ of parallel/parallel converter circuit 17, and a single serial/parallel converter circuit 68 having a serial input coupled to a serial output terminal 67$d$ and parallel outputs coupled to the inputs of line memory 21. A parallel shift-in control signal $D_s$ and a serial shift-out control signal $P_s$ are applied to parallel/serial converter circuit 67 from control block 66.

The operation of this embodiment with respect to the transfer of successive sets of R, G and B digital color signals to output terminals 17x, 17y and 17z of parallel/parallel converter circuit is identical to that of the first embodiment described above. However each time an A/D conversion operation is performed, and the digital color signals resulting from this operation appear on output terminals 17x, 17y and 17z of parallel/parallel converter circuit 17, a shift-in control signal $D_s$ is input to parallel/serial converter circuit 67 from cb 66, whereby the output signals from terminals 17x, 17y and 17z are respectively set into corresponding stages of parallel/serial converter circuit 67 (indicated as a, b and c respectively). Upon completion of this shift-in operation and prior to commencement of the next A/D conversion operation by A/D converter circuits 14, 15 and 16, the contents of parallel/serial converter circuit 67 are shifted into serial/parallel converter circuit 68, in response to a shift-out signal Ps applied to parallel/serial converter circuit 67. Thus, a total of n of each of these shift-in and shift-out operations will take place during each horizontal scanning interval, i.e. one operation for each of the color element sets in a display line. It can thus be understood that, as a result of the switching control of transfer of input R, G and B digital color signals Rd, Gd and Bd applied to parallel/parallel converter circuit 17 to output terminals 17x, 17y and 17z thereof in accordance with the current status of addressing the scanning electrodes as described hereinabove for the first embodiment, the contents of serial/parallel converter circuit 68 at the end of each horizontal scanning interval (indicated as a1, b1, c1, a2, . . . , cn), i.e. the sequence of R, G and B digital color signals data contained therein, will be matched to the array sequence of color filters of the display line which is addressed during the immediately succeeding horizontal scanning interval. These data are then latched into line memory 21, to control drive signals applied by data electrode drive circuit 22 during that horizontal scanning interval, as in the previous embodiments.

It can thus be understood from the above embodiments that the present invention enables display signal processing circuits having a simple circuit configuration and highly reliable operation, together with low power consumption, to be implemented to control drive operations of a color liquid crystal display matrix in which color filters are arrayed in different sequences in mutually adjacent display lines, to provide improved mixing of the R, G and B primary colors with elimination of the "color stripe" phenomenon which arises with conventional types of color liquid crystal display devices.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A color liquid crystal display apparatus, comprising :

a color liquid crystal display unit having a matrix array of liquid crystal display elements with scanning electrodes and data electrodes, and a matrix array of red, green and blue color filters positioned in correspondence with said liquid crystal display elements, said red, green and blue color filters being arrayed along each row of said matrix such as to be arranged in respectively different sequences in mutually adjacent rows;

a data electrode drive circuit for applying drive signals to said data electrodes and a scanning electrode drive circuit for sequentially selecting rows of said display element matrix by applying drive signals to said scanning electrodes;

a line memory for storing display data for successive ones of said rows of display elements and for applying said data to said data electrode drive circuit;

a control section for producing a plurality of control and timing signals including signals for controlling sequential driving of said scanning electrodes whereby each of said liquid crystal display element rows is driven in accordance with said display data during a corresponding horizontal scanning interval of fixed duration during each of successive frame intervals;

a source of successively produced sets of parallel R (red), G (green) and B (blue) digital color signals each comprising at least one bit and constituting said display data for a mutually adjacent set of liquid crystal display elements in a row of said matrix;

selection switch control means having a plurality of output terminals and having a plurality of input terminals coupled to receive said R, G and B digital color signals from said source thereof, and responsive to control signals produced by said control section for transferring respective ones of said R, G and B digital color signals from said input terminals to specific ones of said output terminals in accordance with the status of display matrix row selection, and;

signal shifting circuit means coupled to receive said R, G and B digital color signals from said output terminals of said selection switch control means, and acting to arrange said R, G and B digital color signals, successively output in parallel from said output terminals during each of said horizontal scanning intervals, in a fixed array sequence during said each horizontal scanning interval;

said line memory being responsive to one of said timing signals from said control section for storing said sequentially arrayed contents of said signal shifting circuit means therein at the termination of said each horizontal scanning interval.

2. A color liquid crystal display apparatus according to claim 1, in which said selection switch control means comprise a parallel/parallel converter circuit including logic gate circuits controlled by said control signals from said control section for selectively transferring said R, G and B digital color signals to said output terminals of said parallel/parallel converter circuit.

3. A color liquid crystal display apparatus according to claim 2, in which said control section comprises circuit means for generating a horizontal sync pulse in synchronism with each of said horizontal scanning intervals and a vertical sync pulse in synchronism with each of said frame intervals, line counter circuit means for counting said horizontal sync pulses under the control of said vertical sync pulses, and decoder circuit means for decoding the count contents of said line counter circuit means to produce said control signals varying in accordance with said matrix row selection status.

4. A color liquid crystal display apparatus according to claim 2, in which said color liquid crystal display apparatus comprises a television receiver including a television signal receiving section for receiving a television signal and circuit means for deriving R, G and B analog color signals from said television signal, and further comprising first, second and third analog/digital converter circuits for converting said R, G and B analog color signals respectively into said R, G and B digital color signals in response to said timing signals from said control section, and moreover comprising sync separator circuit means for deriving said horizontal and vertical sync pulses from said television signal.

5. A color liquid crystal display apparatus according to claim 1, in which said signal shifting circuit means comprise first, second and third serial/parallel converter circuits controlled by said timing signals from said control section, each having a serial data input terminal coupled to a corresponding one of said output terminals of said selection switch control means and having a plurality of parallel data output terminals coupled to corresponding input terminals of said line memory.

6. A color liquid crystal display apparatus according to claim 1, in which said signal shifting circuit means comprise:

a parallel/serial converter circuit controlled by said timing signals from said control section, having a set of parallel data input terminals respectively coupled to said output terminals of said selection switch control means, and having a serial data output terminal, and;

a serial/parallel converter circuit having a serial data input terminal coupled to said serial data output terminal of said parallel/serial converter circuit and a plurality of parallel data output terminals coupled respectively to corresponding input terminals of said line memory; with said timing signals applied from said control section to said parallel/serial converter circuit acting to shift said successive sets of R, G and B color signal data output from said selection switch control means into said parallel/serial converter circuit in parallel form and to thereupon shift said data in serial form from said parallel/serial converter circuit into said serial/parallel converter circuit.

* * * * *